United States Patent Office 2,769,512
Patented Nov. 6, 1956

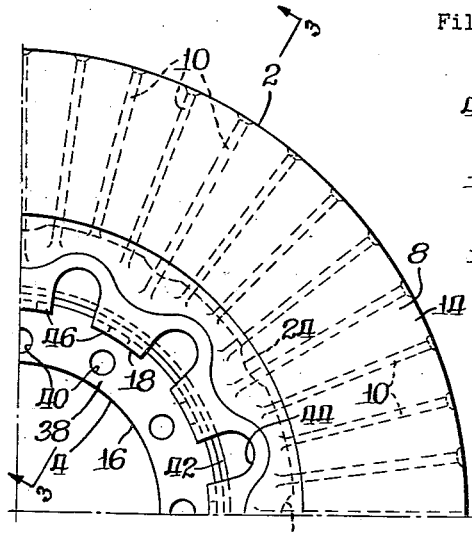
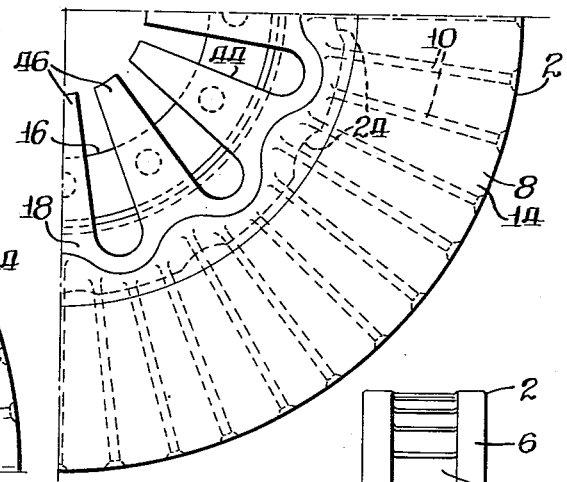
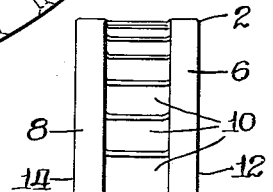
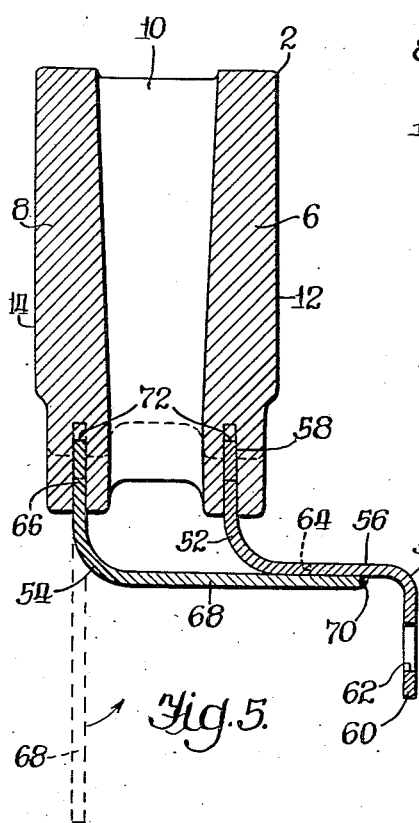
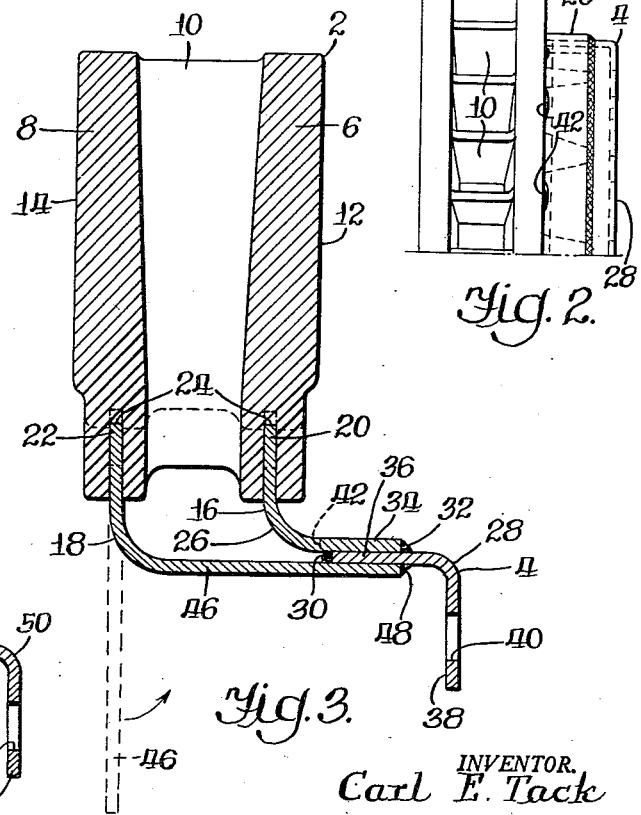

2,769,512

BRAKE ROTOR

Carl E. Tack, Chicago, Ill., assignor to American Steel Foundries, Chicago, Ill., a corporation of New Jersey Application November 2, 1951, Serial No. 254,601

1 Claim. (Cl. 188—218)

This invention relates to off-wheel brakes for railway cars and is more particularly concerned with the provision of a brake rotor adapted to be secured to the wheel of a wheel and axle assembly and frictionally engaged between a pair of stators to decelerate a car.

The present invention contemplates the provision of a brake rotor construction in which a brake ring is cast onto the outer periphery of an annular structure designed to resiliently support the ring and to conduct heat therefrom when the latter is frictionally engaged by the stators.

This invention further contemplates the provision of a brake rotor having a brake ring cast to provide a pair of annular friction plates secured in spaced relation by means of radially disposed circumferentially spaced blades, the ring being mounted upon an annular support including a pair of ring plates having their outer peripheries embedded within the inner peripheries of their associated friction plates.

This invention further contemplates the method of making a brake rotor in which one of the ring plates is bent into engagement with and welded to its companion ring plate to form a sturdy, heat conductive support for the brake ring.

This invention further contemplates the provision of a brake rotor construction in which a brake ring is mounted upon an annular support comprising a pair of ring plates formed with openings to define a plurality of circumferentially spaced spokes to increase the flexibility of the support and to provide passageways for streams of cooling air leading into the air spaces defined by the friction plates and spaced blades.

This invention further contemplates the method of making a brake rotor in which one of the ring plates is formed with a plurality of radially disposed spokes spaced about its inner periphery, the spokes being bent from a common plane normal to the axis of the rotor toward the companion ring plate for welded engagement therewith.

This invention embodies other novel features, details of construction and arrangement of parts which are hereinafter set forth in the specification and claim and illustrated in the accompanying drawings wherein:

Figure 1 is a fragmentary front elevational view illustrating a brake rotor embodying features of the present invention;

Figure 2 is a fragmentary side elevational view of the rotor;

Figure 3 is a sectional view taken along the line 3—3 of Figure 1;

Figure 4 is a fragmentary front elevational view showing the spokes of the outer ring plate disposed in a common plane prior to being bent toward and welded to the companion inner ring plate, and Figure 5 is a sectional view, corresponding to Figure 3, illustrating a modified form of the present invention.

Referring now to the drawings for a better understanding of the present invention, the brake rotor is shown as comprising generally a brake ring 2 mounted upon an annular support 4 adapted to be secured to the wheel of a railway car by means of bolts, screws or other fastening means.

The brake ring 2 is shown as comprising a pair of spaced inner and outer annular friction plates 6 and 8 connected together by a plurality of radially disposed circumferentially spaced blades 10, the outer surfaces of the plates being machined to provide smooth parallel friction faces 12 and 14 adapted to be engaged by stators (not shown).

The annular support 4 comprises an inner ring plate 16 and an outer ring plate 18 having their outer peripheral portions 20 and 22, respectively, embedded with the inner peripheral portions of the friction plates 6 and 8, respectively. To prevent relative axial movement of the brake ring 2 relative to the support 4, recesses 24 are formed in the outer peripheries of the ring plates 16 and 18.

As illustrated in Figure 3, the inner ring plate 16 may, if desired, be formed in two sections 26 and 28 telescopically engaged and welded together at 30 and 32, the outer section 26 being formed with a cylindrical portion 34 to snugly receive the cylindrical portion 36 of the inner section 28. The inner section 28 is formed with an inturned flange 38 having circumferentially spaced apertures 40 to receive bolts or screws to secure the inner ring plate 16 to a railway car wheel or other rotatable member to be decelerated. To increase the flexibility of the inner ring plate 16 and to provide passageways for streams of cool air leading into the air chambers defined by the friction plates 6 and 8 and blades 10, the outer section 26 is formed with circumferentially spaced apertures 42 at the juncture of the outer portion 20 and the cylindrical portion 34.

The inner periphery of the outer ring plate 18 is formed with a plurality of circumferentially spaced recesses 44 defining spokes 46 having their ends welded at 48 and 30 against the inner surface of the cylindrical portion 36 of the inner section 28. During rotation of the rotor it will be noted that streams of cool air will pass through the recesses 44 and apertures 42 and thence between the friction plates 6 and 8 to cool the brake ring 2.

Figure 5 in the drawings illustrates a modified form of this invention in which the brake ring 2 is mounted on an annular support 50 comprising an inner ring plate 52 and an outer ring plate 54. In this form of the invention the inner ring plate 52 is shown as comprising a single piece of sheet metal blanked and formed to provide a cylindrical body portion 56 having an outturned flange 58 on one of its ends and an inturned flange 60 on the other of its ends, the flange 58 being embedded within the friction plate 6 of the brake ring 2, and the flange 60 being formed with apertures 62 for bolted engagement with a railway car wheel. To form air passageways and to increase the flexibility of the ring plate 52, a plurality of apertures 64 are formed in the plate at the juncture between the body portion 56 and the outturned flange 58.

The outer peripheral portion 66 of the outer ring plate 54 is embedded within the inner peripheral portion of the friction plate 8, and the inner periphery of the ring plate is formed with a plurality of circumferentially spaced recesses to provide spokes 68 having their ends welded at 70 to the inner surface of the cylindrical body portion 56 of the inner ring plate 52. Recesses 72 are formed in the outer peripheries of the outer ring plate 54 and outturned flange 58 to prevent relative rotatioanl movement between the brake ring 2 and the support 50.

In the manufacture of the two forms of rotors herein shown and described, it is contemplated that the inner and outer ring plates shall be placed within a suitable mold and embedded within their respective friction plates during pouring of the metal forming the brake ring 2.

During this step in the manufacturing operation, it will be noted that the spokes (46 or 68) on the outer ring plate of the supports 4 or 50 are disposed in a common plane perpendicular to the axis of the rotor, as illustrated in dotted outline in Figures 3 and 5. After the metal has been poured to form a brake ring 2 having portions of the support embedded therein, the spokes (46 or 68) are bent to engage and be welded to the inner ring, as shown and heretofore described.

In the operation of the rotor, the brake ring is engaged between a pair of stators to decelerate a rotating body such as a wheel and axle assembly of a railway car. To dissipate heat generated by the frictional engagement between the brake ring and stators and thus prolong the service life of the rotor, the brake ring is constructed in the form of a centrifugal blower in which the blades 10 act to force streams of air radially between the friction plates. It will also be noted that a considerable amount of heat will flow by conduction from the brake ring into the ring plates forming the annular support for the brake ring, and that this heat will then be quickly dissipated and carried off by streams of cool air passing through the apertures and recesses formed in the ring plates. While the rotor may be constructed from various metals, it is contemplated that the annular support may be blanked and formed from sheet steel or other metals or alloys having suitable physical and heat transfer properties, and that the brake ring may be a one-piece iron casting.

While this invention has been shown in but two forms, it is obvious to those skilled in the art that it is not so limited but is susceptible of various changes and modifications without departing from the spirit and scope of the claimed invention.

I claim:

A method of making a brake rotor having a pair of annular friction plates comprising forming a sheet metal support consisting of a flat annular plate having a plurality of notches in its inner perimeter defining spaced spokes projecting radially inwardly from the inner perimeter of the plate, forming another support consisting of a cylinder with a radially outwardly projecting flange, positioning the plate and flange in spaced relationship to each other in a mold, casting said friction plates respectively integral with the plate and the flange and spaced from the spokes and cylinder, removing the rotor from the mold, bending the spokes into radially overlapping relationship with the inner perimeter of the cylinder and securing said spokes to said cylinder internally thereof.

References Cited in the file of this patent

UNITED STATES PATENTS

| | | |
|---|---|---|
| 2,076,538 | Bendix | Apr. 13, 1937 |
| 2,197,232 | Wood | Apr. 16, 1940 |
| 2,208,525 | Eksergian | July 16, 1940 |
| 2,233,594 | Eksergian | Mar. 4, 1941 |
| 2,243,334 | Eksergian | May 27, 1941 |
| 2,431,741 | Eksergian | Dec. 2, 1947 |

FOREIGN PATENTS

| | | |
|---|---|---|
| 4,957 | Switzerland | Feb. 27, 1892 |